(12) United States Patent
Venable et al.

(10) Patent No.: US 6,286,026 B1
(45) Date of Patent: Sep. 4, 2001

(54) METHOD AND APPARATUS FOR INTEGRATING PULL AND PUSH TASKS IN PIPELINE DATA PROCESSING

(75) Inventors: Dennis L. Venable, Marion; Patrick A. Fleckenstein, Rochester; James E. Bollman, Williamson, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/134,866

(22) Filed: Aug. 17, 1998

(51) Int. Cl.[7] ....................................................... G06F 9/00
(52) U.S. Cl. ............................................. 709/100; 709/107
(58) Field of Search .................................... 709/100, 101, 709/102, 103, 104, 105, 106, 107; 703/23, 24; 714/15, 30

(56) References Cited

U.S. PATENT DOCUMENTS 5,557,795   9/1996   Venable .
5,995,996 * 11/1999   Venable et al. ...................... 709/100

* cited by examiner

Primary Examiner—Majid Banankhah
(74) Attorney, Agent, or Firm—Oliff & Berridge, PLC

(57) ABSTRACT

This invention provides a device and method for processing data with a data processing string having push type and pull type tasks. Push tasks processes data and pushes the output of the process to downstream push tasks based on link paths. On the other hand, pull tasks sends data requests via upstream links to upstream pull tasks to acquire data for processing. Data processing strings are usually configured with either push tasks and/or pull tasks to maintain consistency in the direction of links. The preferred embodiments of this invention provides a method and apparatus for inserting push tasks in a string of pull tasks and inserting pull tasks in a string of push tasks. The inserted push and pull tasks are enhanced with forward and backward message links and interface tasks are provided to interface between the inserted pull or push tasks in the strings of push or pull tasks, respectively.

23 Claims, 13 Drawing Sheets

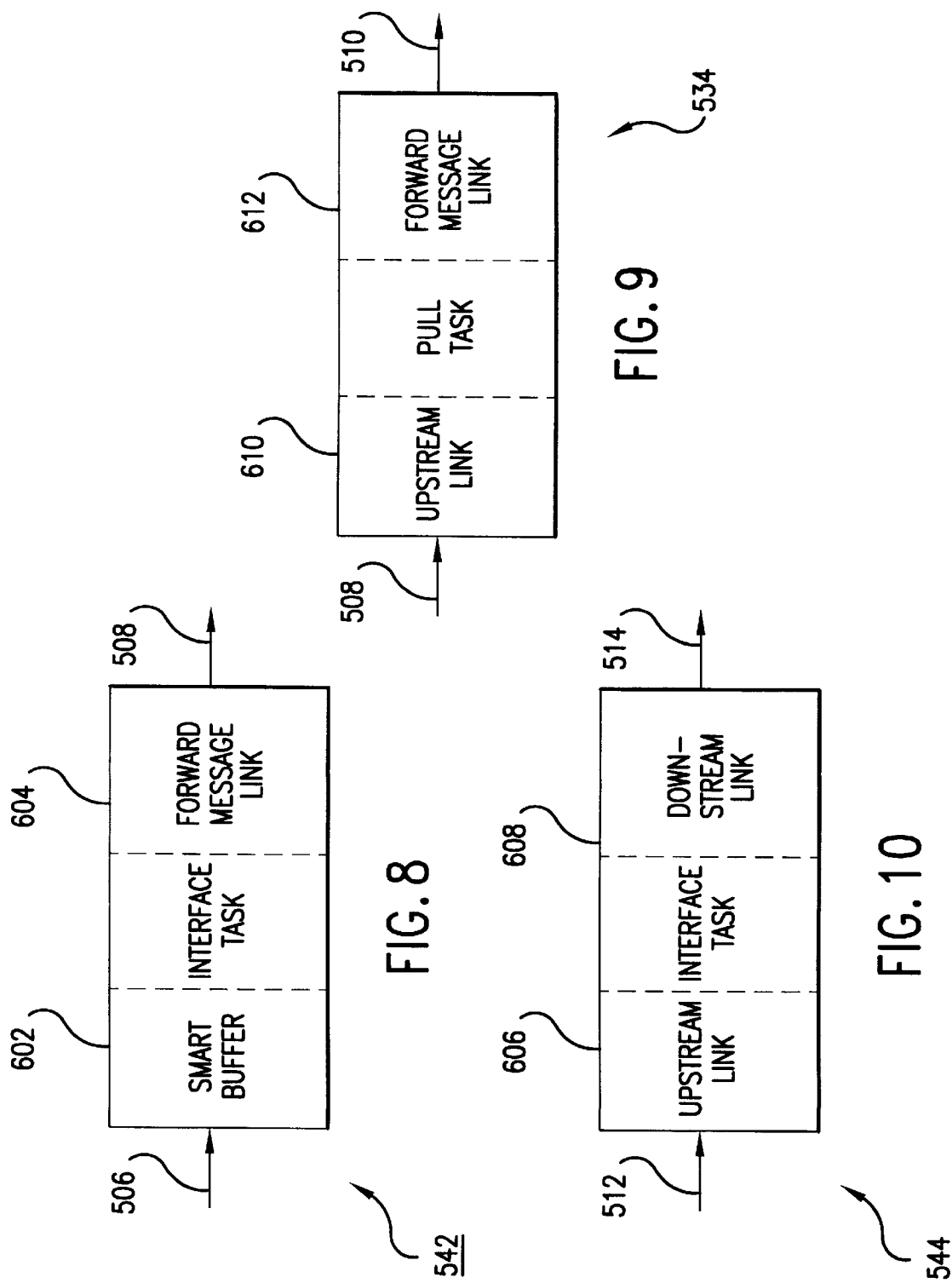

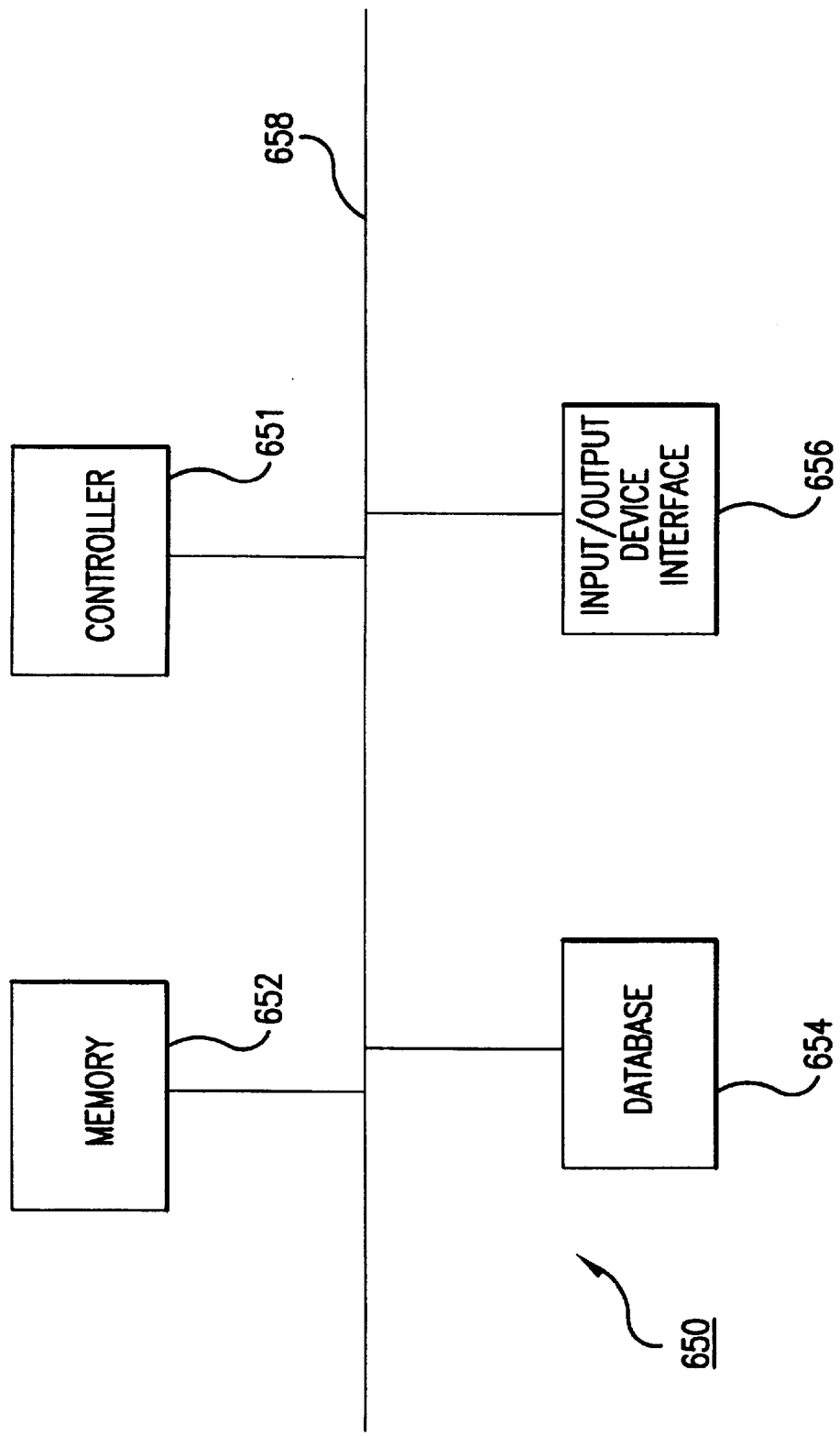

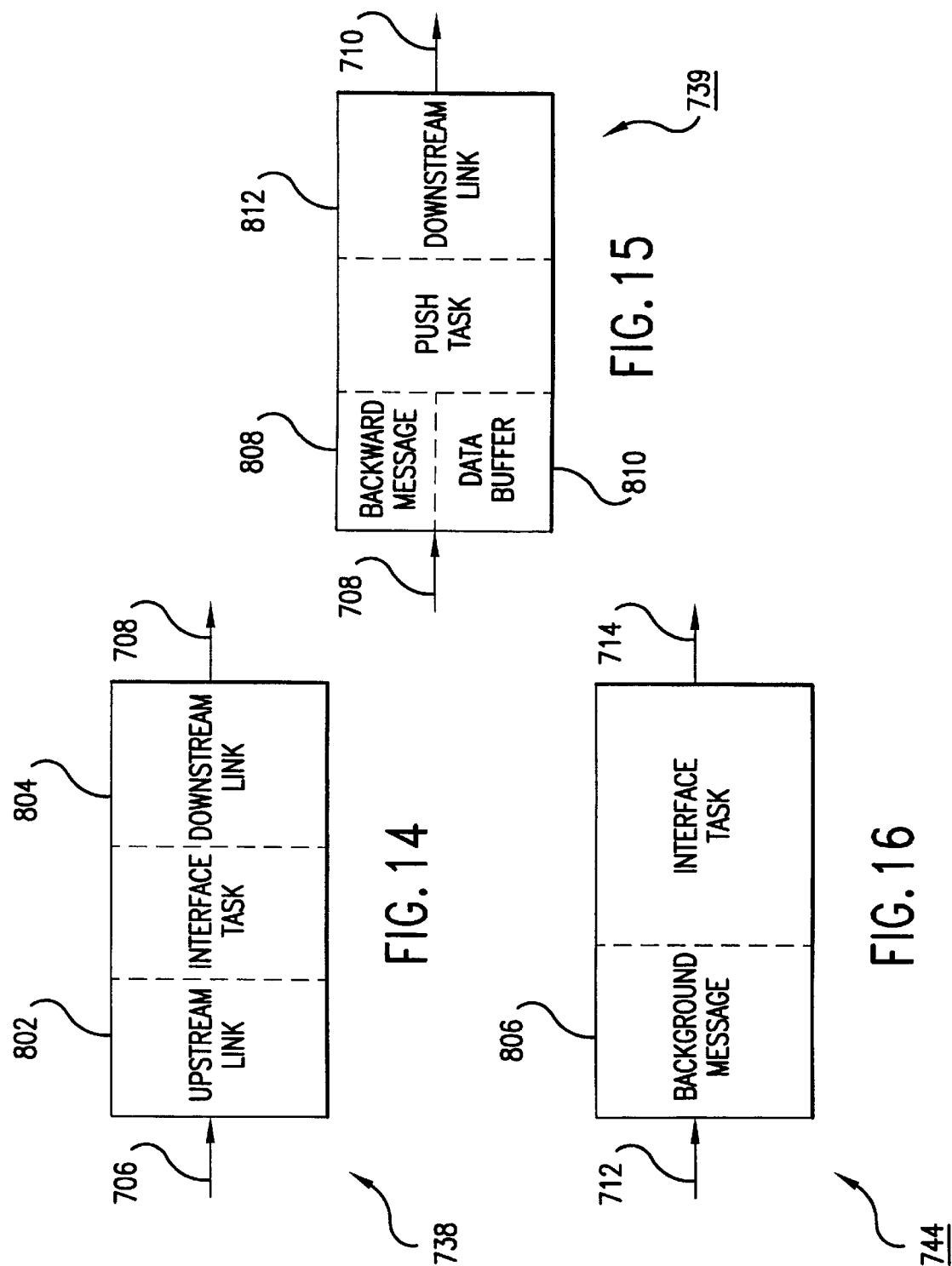

METHOD AND APPARATUS FOR INTEGRATING PULL AND PUSH TASKS IN PIPELINE DATA PROCESSING

BACKGROUND OF THE INVENTION

1. Field of Invention

This invention relates to data processing having pull and push tasks.

2. Description of Related Art

In a system that emulates a multi-processing pipeline using a single-processing environment, each section of the pipeline is an instantiated function, or task, that performs one or more desired functions such as image processing functions, and sufficient data structure to self-define the state of the task. Such a system is disclosed in U. S. Pat. No. 5, 557,795 which is hereby incorporated by reference.

In operation, when a host application requires data from a raw data source to be processed, such as image data from a scanner or an image data file, a data processing pipeline is formed between the data source and the host application. The data processing pipeline inputs the raw data from the data source, processes the data so that it is in a form the host application can use, then provides it to the host application.

The image processing pipeline is formed by calling one of the functions in an image processing library, for example, and instantiating the called function to form a first task. The first task becomes an upstream-most section of the pipeline. The upstream-most pipeline section obtains a data element to be processed from the data source. In an image processing system, the data element could be a single scanline of a raster scan of an image. The data source could be a scanner, a facsimile machine, a remote computer, a sensor, or the like, outputting a serial or parallel data signal, or a block of stored data in a memory, such as a ROM, a RAM, or a disk in a disk drive. The data element can also be directly generated by the first pipeline section itself. In this last case, the data element can be obtained from the value of an initialized variable, from the state of the first pipeline section, or the like. Once the first pipeline section is instantiated, a backward or upstream link of the host application is set to the first pipeline section.

A second pipeline section is then generally needed to process the data element obtained by the first pipeline section. Therefore, the host application creates another task by instantiating one of the functions in the library to form a second pipeline section. When this second pipeline section is created, it is automatically linked to the first pipeline section. Additionally, the link of the host application is reset to the second pipeline section. If no other image processing operations are required, the link of the host application remains between the portion of the host application which requires the processed data and the second pipeline section.

Processing tasks in a pipeline processing are usually designed to interface with each other in an efficient manner so that a minimum of external controls are required to process the data. However, conventionally only similar types of processing tasks are integrated together to achieve one processing goal. This restriction is undesirable and thus new technology is required to provide greater flexibility in pipeline data processing.

SUMMARY OF THE INVENTION

This invention provides a device and method for processing data with a data processing string having push type and pull type tasks. Push tasks processes data and pushes the output of the process to downstream push tasks based on link paths. On the other hand, pull tasks sends data requests via upstream links to upstream pull tasks to acquire data for processing.

Data processing strings are usually configured with either all push tasks or all pull tasks to maintain consistency in the direction of links. The preferred embodiments of this invention provides a method and apparatus for inserting push tasks in a string of pull tasks and/or inserting pull tasks in a string of push tasks. The inserted push and pull tasks are enhanced with forward and backward message links and interface tasks are provided to interface between the inserted pull or push tasks in the strings of push or pull tasks, respectively.

When pull tasks are inserted in a push task string, a first interface task is placed between upstream push tasks and inserted pull tasks and a second interface is placed between the inserted pull tasks and downstream push tasks. When upstream push tasks pushes data into the first interface task, the first interface task invokes a forward message indicating the amount of data to the downstream inserted pull tasks. Each of the successive pull task also generate forward messages indicating the amount of data available until the information propagates to the second interface task. The second interface task then generates a data request and propagates the data request through the inserted pull tasks up to the first interface task. The first interface task responds by sending data downstream until the second interface task receives the processed data and pushes the processed data to downstream push tasks.

When push tasks are inserted in a string of pull tasks, a third interface task is inserted between upstream pull tasks and inserted push tasks and a fourth interface task is placed between the inserted push tasks and downstream pull tasks. When the downstream pull tasks sends a data request to the fourth interface task, the fourth interface task sends a backward message to upstream inserted pull tasks. The backward message is propagated through the inserted pull tasks until a backward message is sent to the third interface task. The third interface task responds by sending a data request to the upstream pull tasks which results in a first pull task pulling data from a database. When the upstream pull tasks process the data from the database and returns the data to the third interface task, the third interface task pushes the data into the inserted push tasks which results in data being pushed into the fourth interface task. When the fourth interface task receives the data pushed from the inserted push tasks, the data is returned to the downstream pull task that originally requested the data.

In view of the above, the first, second, third and fourth interface tasks as well as the forward message and backward message links enable push tasks to be inserted in a string of pull tasks and pull tasks to be inserted in a string of push tasks.

BRIEF DESCRIPTION OF THE DRAWINGS

This invention is described in connection with the following figures wherein like numerals reference like elements, and wherein:

FIGS. 8–10 show block diagrams of the interface tasks and the pull tasks shown in FIG. 7;

FIG. 11 shows a block diagram of a processor for processing data processing pipelines;

FIGS. 14–16 show block diagrams for the interface tasks and the push tasks shown in FIG. 13.

DETAILED DESCRIPTION OF PREFERRED EMBODIMENTS

A function in a single processing environment may be instantiated as a pull type task or a push type task. Pull tasks form a processing string by upstream links. When data is required for processing, a pull task issues a data request to an upstream pull task. The data request remains active until the requested data is delivered by the upstream pull task. Thus, in a pipeline of pull tasks, a host application that receives the output of the pipeline begins by requesting data from a "last" pull task and the data request is propagated up to a first pull task of the pipeline which in turn retrieves the required data from a data source such as a database, for example. Thus, in a pull task processing string or pipeline, the direction of the data requests is upstream while the data flow is downstream.

In a push task processing string or pipeline, there are no data requests because data is "pushed" from a push task to a linked downstream push task. The host application begins by pushing data into a first push task of the pipeline. Data is processed and pushed successively downstream based on the links until output data is pushed out of the pipeline by a last push task. Thus, for push tasks, both the direction of links and the direction of data flow is downstream.

Data is processed by the pull and push tasks in standard unit sizes. For image processing in devices such as digital cameras, printers, scanners and facsimile machines etc., for example, the unit size may be a line. Thus, a pull task may request data from an upstream pull task one line at a time. If multiple lines are needed for a particular process, multiple data requests are issued and the data is buffered in the memory until the needed number of lines are received. A similar memory may be required for push tasks. Data pushed from upstream push tasks are buffered in the memory until enough data is received for the associated process to continue.

For example, pull or push tasks may scale the image data down by a factor of 2 to 1. Thus, two lines may be required before the process can be executed to produce one line of output. In a pipeline of pull or push tasks, any of the tasks may require multiple input units before processing can begin. Thus, many upstream pulls and downstream pushes may occur before data is finally output by the last task.

Figure 1:
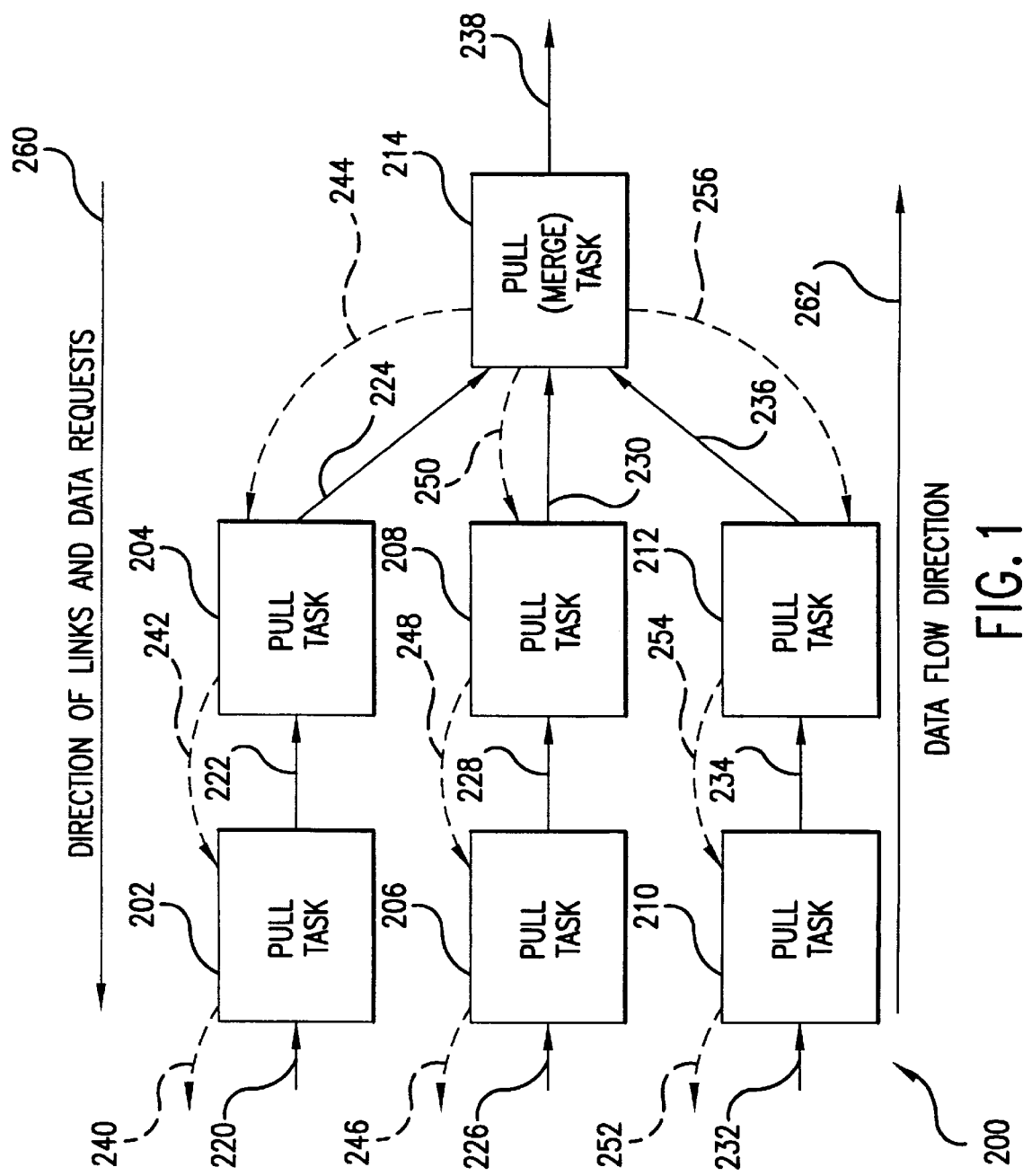
FIG. 1 shows a data processing pipeline having all pull tasks.

For example, FIG. 1 shows a block diagram 200 of a data process using pull tasks 202–214. The block diagram 200 has three process strings where each of the process strings includes two serially connected pull tasks. For example, the first string includes pull tasks 202 and 204 having data paths 220 and 222 and link paths 240 and 242; the second string includes pull tasks 206 and 208 and has data paths 226 and 228 and link paths 246 and 248; and the third string includes pull tasks 210 and 212 and has data paths 232 and 234 and link paths 252 and 254.

The three strings of pull tasks are coupled to a merge pull task 214 (which is a last pull task) through the data paths 224, 230 and 236 and link paths 244, 250 and 256. The merge pull task 214 may be an application, a physical device or another pull task performing its own function similar to the other pull tasks 202–212, for example. If the merge pull task 214 is another pull task, then there would be a link path (not shown) input into the merge pull task 214. The merge pull task 214 generates output data that is output through data path 238.

The block diagram 200 may represent a process for processing color data where each of the strings processes one type of color and the merge pull task 214 combines all three colors into a final image for output. Assuming that the merge pull task 214 processes one line of the image data at a time, when the processing for a current line is completed, the pull task 214 may request data from the upstream pull tasks 204, 208 and 212 via the link paths 244, 250 and 256 for a next line of data. Upon receiving the respective data request, each of the pull tasks 204, 208 and 212 requests data via the link paths 242, 248 and 254 from further upstream pull tasks 202, 206 and 210, respectively, for the data required to generate the line of data requested by the pull task 214.

In response to the data request from the pull tasks 204, 208 and 212, the pull tasks 202, 206 and 210 also issue data requests to still other pull tasks upstream from themselves through the link paths 240, 246 and 252, respectively. This continues until first pull tasks receive data requests from respective downstream pull tasks. The first pull tasks pulls data from a database when such data is available. When data is received from the database, the first pull tasks process the data and return their outputs to the respective downstream pull tasks. The downstream pull tasks further process the data and return the outputs to still further downstream pull tasks and so on until the data is passed down the pull task string and reaches the merge pull task 214. The pull task 214 combines all the data received from the three independent strings and processes the data accordingly for output through the data path 238. Thus, the direction of link paths is upstream as shown by arrow 260 while the direction of data flow is downstream as shown by arrow 262.

Figure 2:
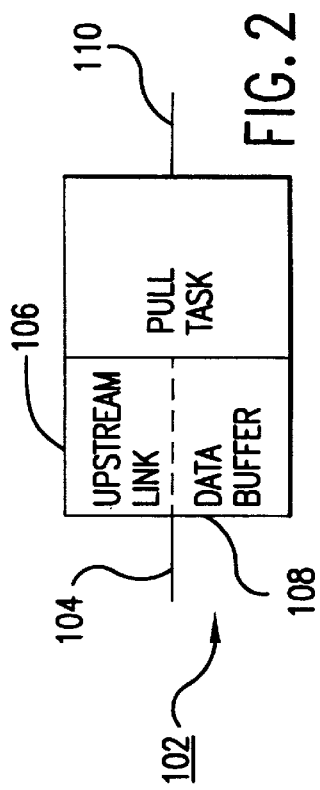
FIG. 2 shows a block diagram of a pull task.

FIG. 2 shows a block diagram of a generic pull task 102 in greater detail. The pull task 102 includes an upstream link 106 and a data buffer 108. As discussed earlier, the upstream link 106 provides the ability to send data requests to designated upstream tasks when data is needed for processing. The data buffer 108 stores data received until enough data (e.g., lines) are received to complete the pull task process. The data buffer 108 may not be needed if the pull task process may begin processing for each line received.

As discussed earlier, the pull tasks 202–214 are instantiated in a single processing environment. When data is passed from one pull task to another, the data is actually stored in a memory and a pointer to the address of the data is passed from one instantiated pull task to the next. Thus, if a particular pull task requires more than one unit of data (e.g., a line), then a data buffer (memory space) must be allocated for the particular pull task.

Figure 3:
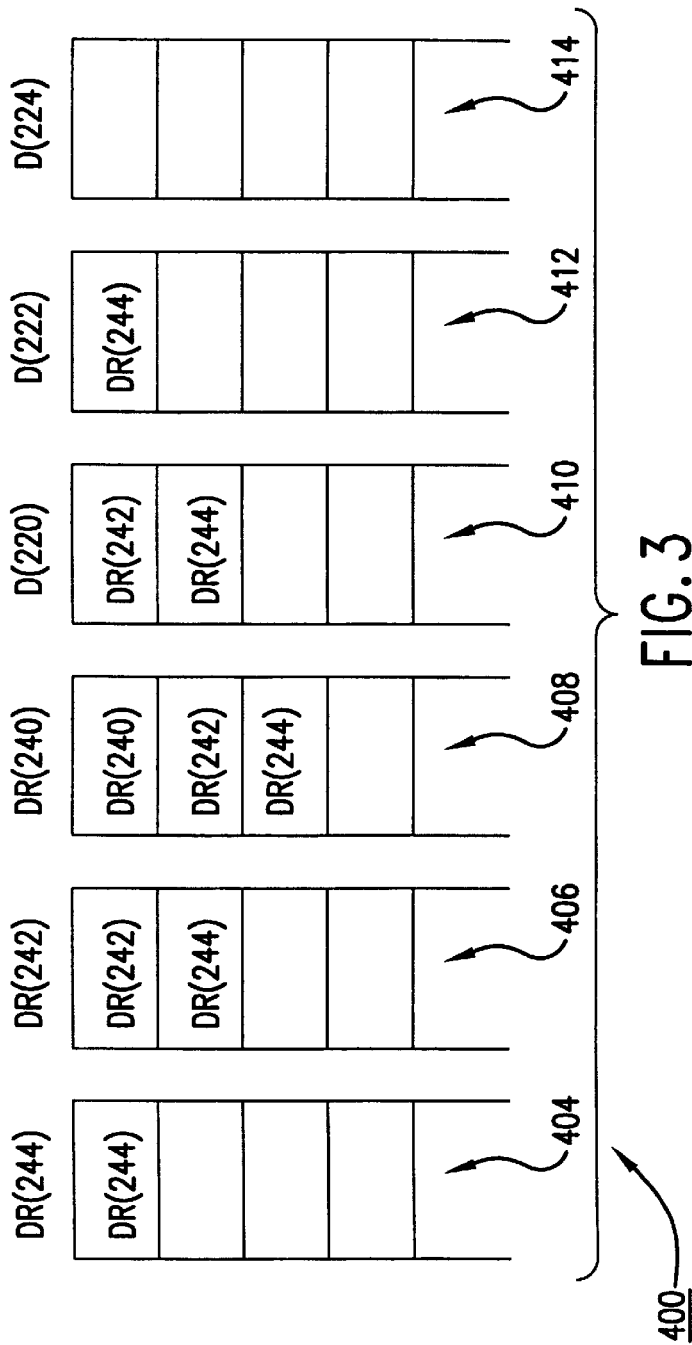
FIG. 3 shows a first set of process stack states for one of the processing strings shown in FIG. 1.

FIG. 3 shows an example of a process stack 400 of the single controller processing environment for the first process string that includes pull tasks 202, 204 and 214. The process stack 400 records the sequence of tasks (pushed into the process stack 400) that had control of the single controller. This sequence must be retraced through the tasks in reverse order to maintain proper control of the processing environment. The data that is actually placed into the process stack 400 may be the instruction counter and perhaps the machine state of the controller corresponding to a task so that control may be returned to the task when the data is popped (retrieved) from the process stack 400, for example.

As indicated in FIG. 1, the sequence of data requests begins with the pull task 214 requesting data from the pull task 204 via the link path 244. When the pull task 214 makes such a data request, the data request, DR(244), is pushed into the process stack 400 resulting in a process stack state 404. In response to the data request from the pull task 214, control is passed to the pull task 204 which makes a data request of the pull task 202 via link path 242 and the data request DR(242) is pushed into the process stack 400 resulting in a process stack state 406 and control is passed to the pull task 202.

Assuming that the pull task 202 is a first pull task, then the link path 240 points to a data source such as a database where data is accumulated for processing. Thus, the pull task 202 sends a data request to the database via the link path 240 and the data request DR(240), is pushed into the process stack 400 resulting in a process stack state 408. At this point, control is passed to the database and the process stack 400 contains three data requests corresponding to link paths 240, 242 and 244 in that order.

When the database returns the data D(220) along the data path 220 corresponding to the data request issued by the pull task 202, the data request DR(240) is popped from the process stack 400 resulting in a process stack state 410 and control is returned to the pull task 202. The pull task 202 processes the data received from the database and outputs the result D(222) to the pull task 204 along the data path 222 and the data request DR(242) is popped from the process stack 400 as shown by process stack state 412 and control is returned to the pull task 204. The pull task 204 in turn processes the data received from the pull task 202 and outputs the result D(224) along the data path 224 to the merge pull task 214 which pops the data request DR(244) resulting in an empty process stack 400 as shown by process stack state 414 and control is returned to the merge pull task 214 where the sequence started. Thus, the data requests along the link paths 244, 242 and 240 pushes the data requests DR(244, 242 and 240) into the process stack 400 and the data returned through the data paths 220, 222 and 224 pops the data requests DR(244 242 and 240) out of the process stack 400. Control is passed from the merge pull task 214 to the pull task 204 to the pull task 202 to the database and returned to the pull task 202 to the push task 204 and finally back to the merge pull task 214.

Figure 4:
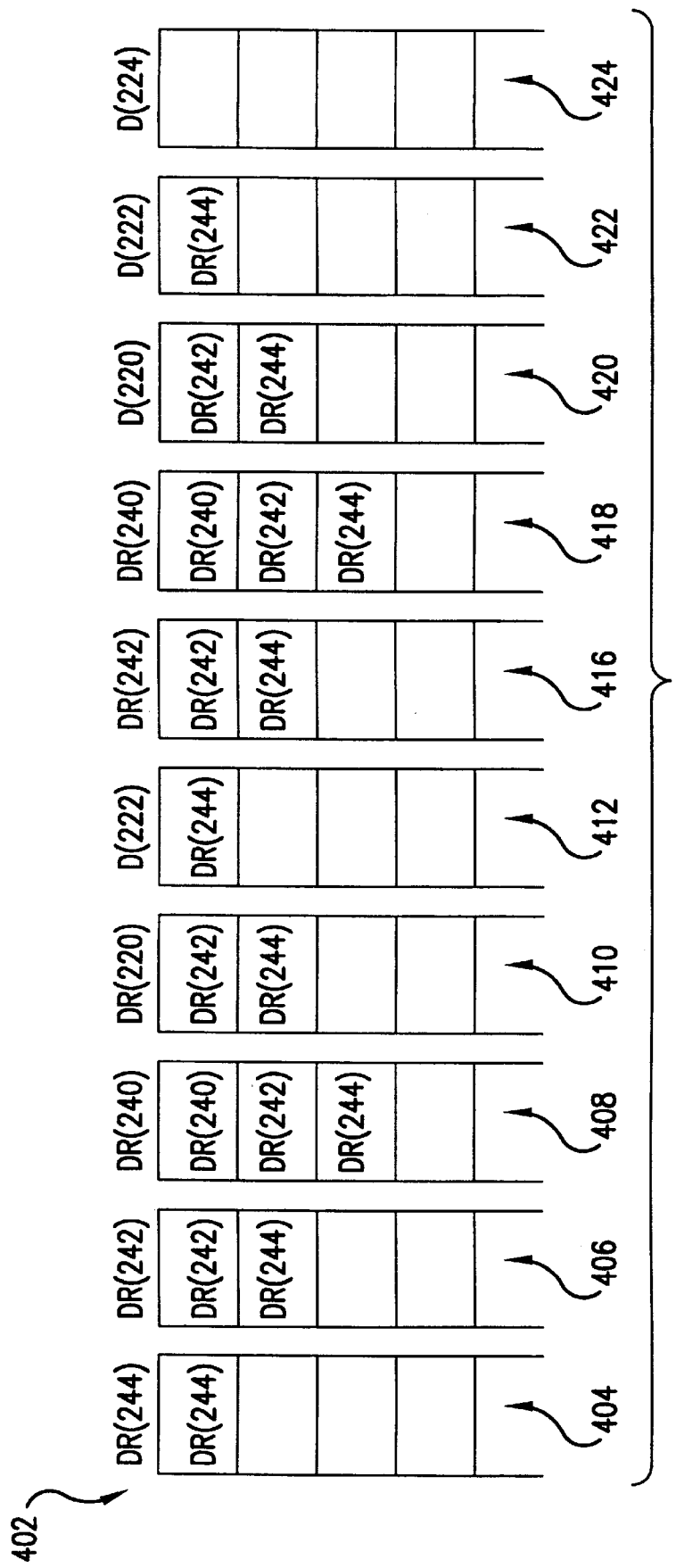
FIG. 4 shows a second set of process stack states for the same processing string of FIG. 3.

FIG. 4 shows a situation where the pull task 204 requires two lines of data before output is generated to the pull task 214 through the data path 224. The process stack states 404–412 is identical to that shown in FIG. 3. However, after the data is received from the pull task 202 through the data path 222, the pull task 204 does not yet have enough data to begin processing. Thus, the pull task 204 again requests data from the pull task 202 via the link path 244 for the additional data needed to begin processing. Thus, the DR(242) is again pushed into the process stack 400 as shown by the process stack state 416. The pull task 202 responds by sending a data request DR(240) through link path 240 for additional data from the database which is represented by the process stack state 418. When the pull task 202 receives data D(220) from the database through the data path 220, the data request DR(240) is popped out of the stack as shown in the process stack state 420 and when the pull task 202 outputs its data D(222) to the pull task 204, the data request DR(242) is also popped out of the process stack 400 as shown by process stack state 422. At this point, the pull task 204 has sufficient data to begin processing. When the output of the pull task 204 is sent to the pull task 214 through the data path 224, the remaining data request DR(244) is popped out of the process stack 400 leaving the stack empty as shown by process stack state 424.

Figure 5:
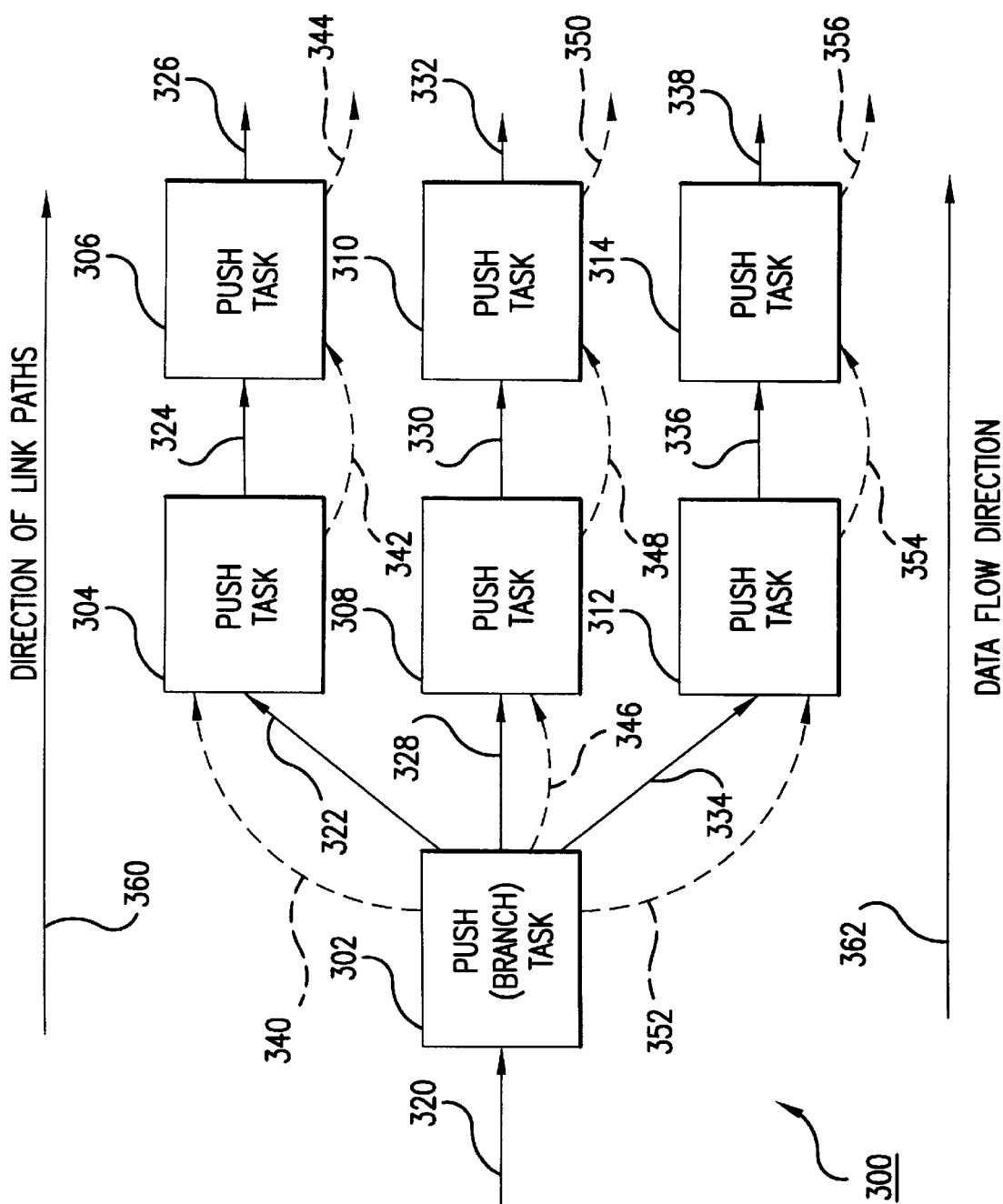
FIG. 5 shows a data processing pipeline having all push tasks.

FIG. 5 shows a block diagram of a process 300 having three strings of push tasks 302–314. The first push task 302 is a branch push task that receives data from some upstream process, processes the data and pushes the process results to downstream push tasks 304, 308 and 312 through data paths 322, 328 and 334. The push task 302 identifies the downstream push task via link paths 340, 346 and 352. When data is pushed to a downstream push task, the data that controls the upstream push task such as the program counter, etc., is also pushed into the process stack 400. This is represented by the following discussion by "pushing" the link into the process stack 400. The push tasks 304, 308 and 312 process the data received from the push task 302 and push their process results down to further downstream push tasks 306, 310 and 314 via data paths 324, 330 and 336, respectively. The push tasks 306, 310 and 314 output their respective process results to yet further downstream push tasks, output buffers and/or devices as identified by the link paths 344, 350 and 356, respectively. Thus, for push task strings, the direction of link paths, as shown by arrow 360, is the same as the data flow direction, as shown by arrow 362.

For example, when the branch push task 302 pushes data into the push task 304 via link path 340, the link 340 L(340) is pushed into the process stack 400. When the data is finally pushed through the process string, the application or device at the end of the process string or pipeline pops the last link from the process stack 400 to return control to the upstream push task which in turn pops the next link which returns control to the next upstream push task and so on until control returns to the application or device upstream from the branch push task 302.

Figure 6:
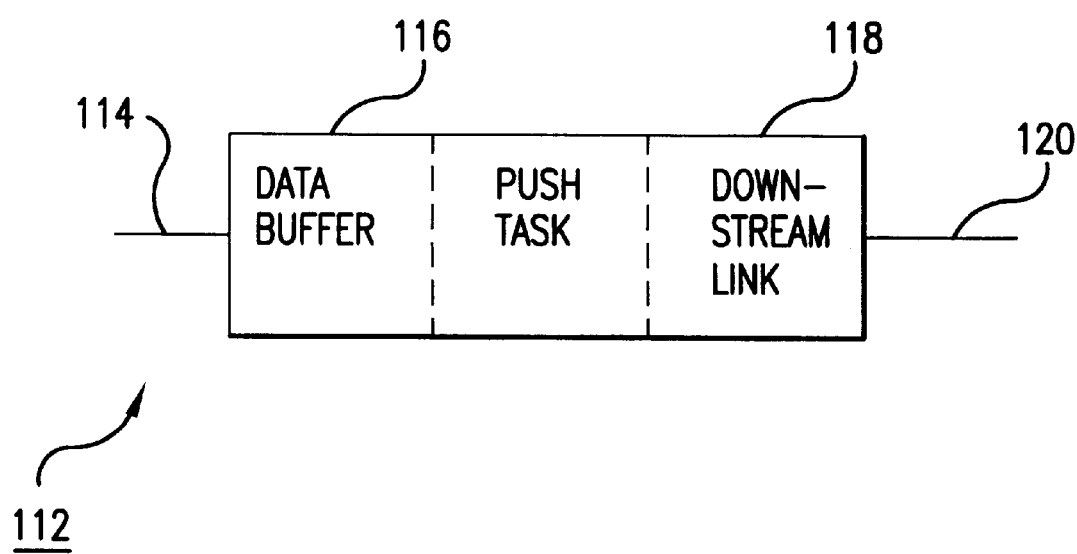
FIG. 6 shows a block diagram of a push task.

FIG. 6 shows a block diagram of a generic push task 112. The push task 112 has a data buffer 116, a downstream link 118, an input data path 114, and output data path 120. The data buffer 116 receives data from an upstream push task and stores the data until sufficient data has been received to execute the push task process. When the push task 112 has completed the process, the output is pushed to downstream push tasks as indicated by the downstream link path 118.

As described above, a data processing string is either constructed of all pull type tasks or all push type tasks so that the direction of links and the direction of data flow will be consistent across all the tasks of the data processing string. The preferred embodiments of this invention provide the ability to insert pull tasks in a push task data processing string or inserting push tasks in a pull task data processing string by only making minor modifications to the push or pull tasks and adding interface modules.

Figure 7:
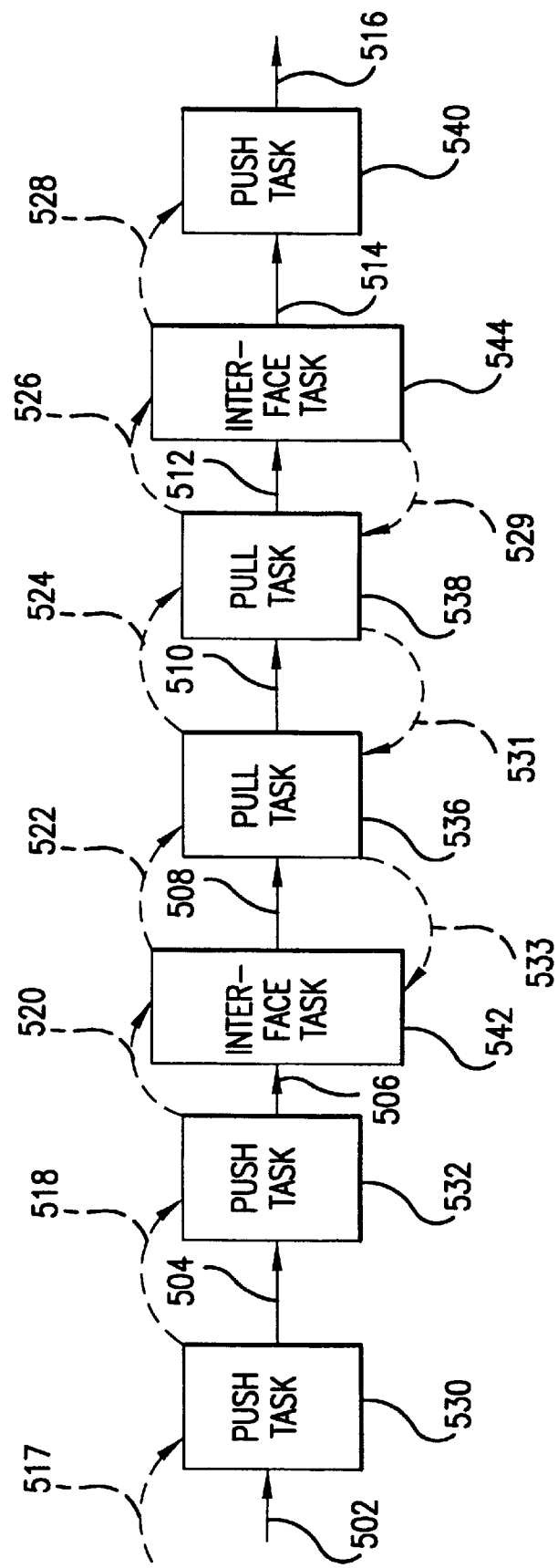
FIG. 7 shows a pipeline processing string having pull tasks inserted in a push task string.

FIG. 7 shows pull tasks 536 and 538 inserted in a string of push tasks 530, 532 and 540. FIG. 7 also shows two interface tasks 542 and 544 that interface push tasks to pull tasks and pull tasks to push tasks, respectively.

FIGS. 8–10 show block diagrams of the interface tasks 542, 544 and a generic pull task 534 that is inserted in push task strings. In FIG. 8, interface task 542 includes a smart buffer 602 and a forward message link 604 that links with downstream pull tasks. The smart buffer 602 collects data being pushed from upstream push task 532 and adjusts the size of the buffer based on the amount of data pushed from the upstream push task 532 and pulled by the pull task 536, for example. When data is received from the upstream push task 532 via the data path 506, the interface task 542 sends a forward message via forward link path 522 to the downstream pull task 536 indicating the amount of data (number of lines, for example) available for the pull task 536 to process. This forward message FM (522) is pushed into the process stack 400 and control is passed to the pull task 536. Control is not passed to the interface task 542 until either a data request is received from the pull task 536 or the forward message FM (522) is returned. When such a data request is received, control is passed to the interface task 542 and the interface task 542 outputs the requested data to the downstream pull task 536 via the data path 508.

FIG. 9 shows a block diagram of the pull task 534. The pull task 534 includes an upstream link 610 and a forward message link 612. The pull task 534 is explained below using the pull task 536 of FIG. 7 as an example. When a forward message from the interface task 542 is received, the pull task 536 determines whether there is sufficient data to begin executing the pull task process. If there is insufficient data, the pull task 536 simply passes control back to the interface task 542 which pops the forward message FM (522) out of the process stack 400. However, if the amount of data indicated by the forward message received from the interface task 542 indicates a sufficient number of data (one line, for example) to execute the pull task process, the pull task 536 sends a forward message of its own via the forward link path 524 to the downstream pull task 538 indicating a number of lines that the pull task 536 can provide to the pull task 538 for processing. This forward message FM (526) is pushed into the process stack 400 and control is passed to the interface task 544. The pull task 538 determines whether the number of lines indicated by the pull task 536 is sufficient to execute the process of the pull task 538. If the number of lines indicated by the pull task 536 is sufficient to execute the pull task 538, the pull task 538 sends a forward message to the downstream interface task 544 indicating the number of lines that the pull task 538 can generate.

As shown in FIG. 10, the interface task 544 includes an upstream link 606 and a downstream link 608. The upstream link 606 permits the interface task 544 to pull date from upstream pull tasks while the downstream link 608 permits the interface task 544 to push data to downstream push tasks.

Returning to FIG. 7, when the forward message FM (526) from the pull task 538 is received, the interface task 544 sends a data request DR (529) to the pull task 538 via the link path 529 to request the number of lines (e.g., one line) indicated by the forward message FM (526) of the pull task 538. The data request DR (529) is pushed into the process stack 400 and control is passed to the pull task 538. After receiving the data request DR (529), the pull task 538 sends a data request DR (531) via the link 531 to the pull task 536 requesting data from the pull task 536. The pull task 536, in turn, sends a data request DR (533) via link path 533 to the interface task 542 for data to be transferred from the smart buffer 602 to the pull task 536. After the above sequence of events, DR (529), DR (531), and DR (533) are all pushed into the process stack 400 and control is passed through the interface task 544 and pull tasks 538 and 536 to the interface task 542.

The interface task 542 responds to the data request DR (533) by sending the requested data to the pull task 536 through the data path 508 which pops the data request DR (533) from the process stack 400 and control is passed to the pull task 536. If the pull task 536 requires more data (e.g., multiple lines) before the pull task 536 process can be executed, then the pull task 538 makes multiple data requests to the interface task 542 until sufficient amount of data has been transferred to the pull task 536 to begin executing the pull task process. The pull task 536 outputs processed data to the pull task 538 through the data path 510 which pops the data request DR (529) from the process stack 400 and control is passed to the pull task 538. If additional data is required, the pull task 538 again issues a data request to the pull task 536 via the link path 531 and the process repeats. When sufficient data has been received, the pull task 538 executes its pull task process and outputs the processed data to the interface task 544 via the data path 512 which pops the data request DR (529) from the process stack 400 and control is passed to the interface tasks 544.

When data is received, the interface task 544 pushes data to the push task 540 via data path 524, and pushes the link 528 L(528) into the process stack 400. The push task 540 pushes data further downstream until an application is reached, for example, at the end of the process string which pops the upstream link from the process stack 400 and control flows upstream until it reaches the interface task 544. The interface task 544 then pops the forward message FM (526) from the process stack 400 moving control to the pull task 538 then the forward message FM (524) is popped from the process stack 400 and so on until control is returned to the application at the beginning of the process string.

FIG. 11 shows a block diagram of an exemplary processor 650 that may execute the data processing string as shown in FIG. 7. The processor 650 includes a controller 651, a memory 652, a database 654 and an input/output device interface 656. The above components are coupled together via signal bus 658.

The processor 650 may be a data processor for a printer, a digital camera, a scanner, a facsimile machine, a CD ROM archive system, etc., for example. The processor 650 may interface with an operator via the input/output device interface 656 to receive commands such as to print or to set the print mode. Input data may also be received into the database 654 via the input/output device interface 656 from other processors. For example, if the processor 650 is a printer processor, the input/output device interface 656 may be coupled to a computer that downloads information into the database 654 for printing through a printer.

When data is received in the database 654 and the controller 651 determines that a sufficient amount of data (i.e., a page of data) has been received, the controller 651 may commence the data processing operation of FIG. 7 by pushing the data stored in the database 654 one line at a time to the push task 530 via the signal path 502. As discussed earlier, the data may not need to be physically moved but rather the controller 651 may simply send a pointer to the push task 530 indicating an address of the data in the database 654. After the data has been pushed to the push task 530, control may be transferred to the data processing string control programs to execute the data processing string as shown in FIG. 7.

As discussed above, the controller 651 maintains a process stack 400 to maintain control of the data processing string. Thus, when a forward message or a data request is generated, the controller 651 pushes the respective forward message or data request into the process stack 400. When a return is generated, the controller 651 pops the respective forward message or data request from the process stack.

Figure 12:
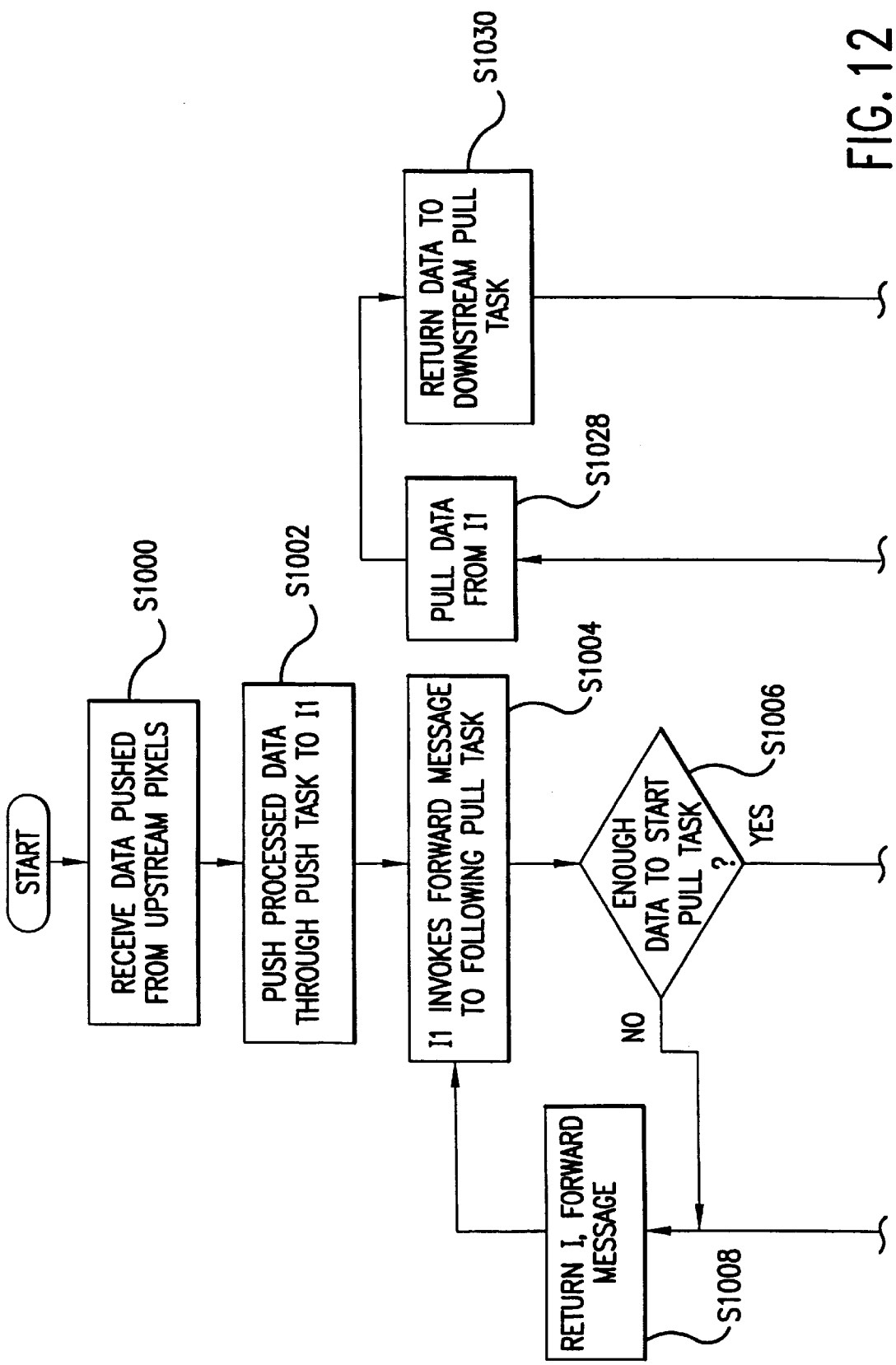
FIG. 12 shows a flow chart of the process for the data processing string shown in FIG. 7.
Figure 12A:
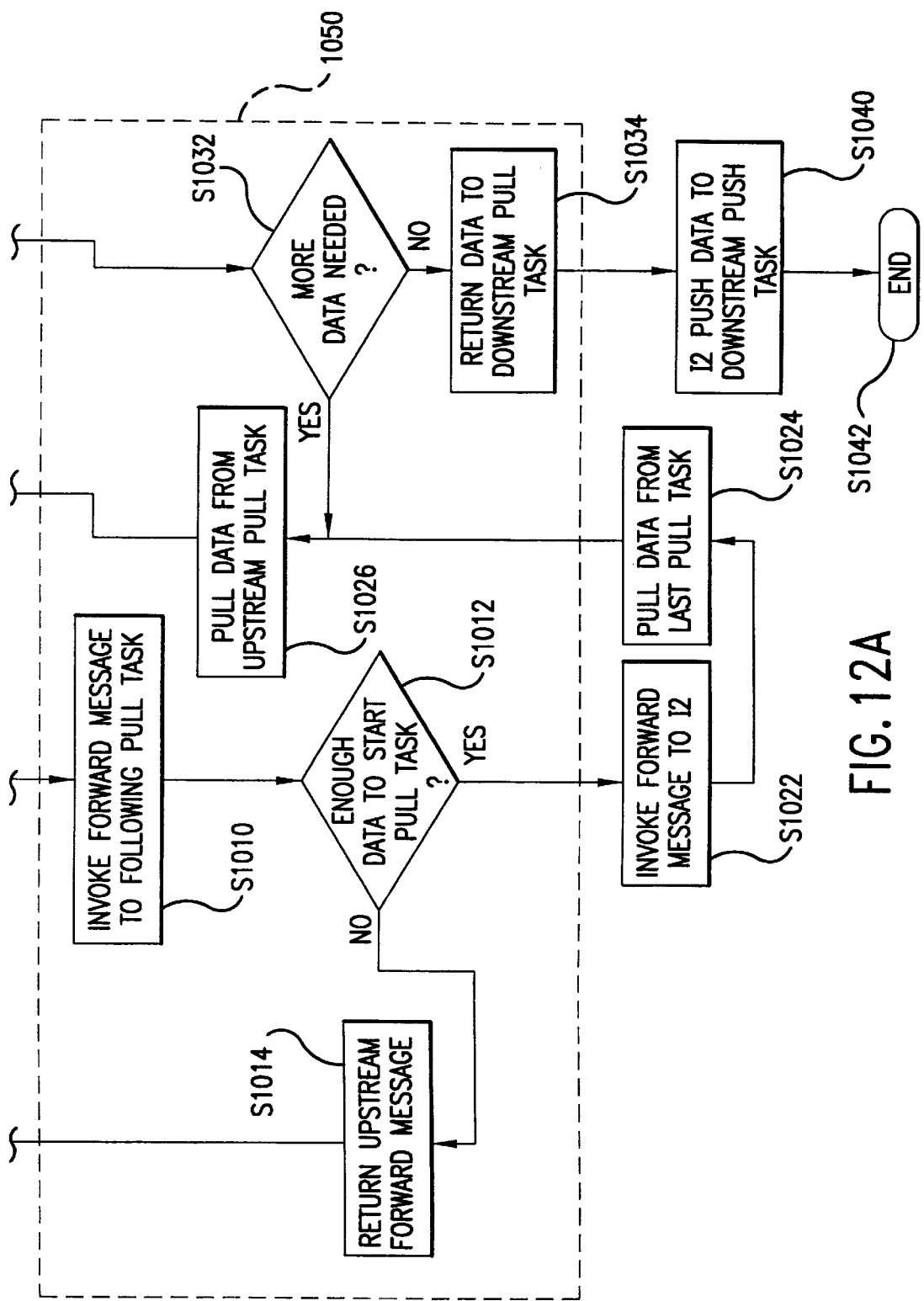

FIG. 12 shows a flow chart of an example that has pull tasks inserted in a string of push tasks. This flow chart only depicts the process stack function that is related to popping forward messages and returning control to upstream tasks related to multiple data pulls. The other process stack functions are discussed above and not detailed here for ease of discussion. In step SI 000, the controller 651 begins the process by receiving data that is pushed into the push tasks 530 and 532 and goes to step S1002 (push task 530 and 532 are treated as a single push task). In step S1002, the controller 651 executes the processes of the push tasks 530 and 532 and pushes the data into the interface task 542 and goes to step S1004. In step S1004, the controller 651 performs the interface task 542 ($I_1$) process by invoking a forward message to a following pull task such as pull task 536 and goes to step S1006. In step S1006, the controller 651 evaluates whether the amount of data indicated in the forward message is sufficient to start the pull task 536. If there is insufficient data, the controller 651 goes to step S1008; otherwise, the controller 651 goes to step S1010. In step S1008, the controller pops the forward message and returns control to the interface task 542 and goes to step S1004. In step S1010, the controller 651 invokes a forward message to a next following pull task and goes to step S1012. In step S1012, the controller 651 evaluates whether the forward message indicates sufficient data for the next following pull task (e.g., pull task 538) to begin execution. If the amount of data is insufficient, the controller 651 goes to step S1014; otherwise, the controller goes to step S1022 (assuming that the next following pull task is a last pull task). In step S1014, the controller 651 pops the upstream forward message, returns control to the upstream task and goes to step S1008.

In step S1022, the controller 651 invokes a forward message from the last pull task to the interface task 544 (12) and goes to step S1024. In step S1024, the controller 651 sends a data request to the last pull task from the interface task 544, pushes the data request into the process stack 400 and goes to step S1026. In step S1026, the controller 651 sends a data request to the next upstream pull task, pushes the data request into the process stack 400, and goes to step S1028. In step S1028, the controller 651 pulls data from the interface task 542 and goes to step S1030. In step S1030, the controller returns data to the downstream pull task, which also pops the data request and passes control to the downstream pull task and goes to step S1032. In step S1032, the controller 651 determines whether there is sufficient data to execute the process of the downstream pull task. If more data is needed, the controller 651 returns to step S1028; otherwise, the controller goes to step S1034. In step S1034, the controller returns data to the interface task 544 which also pops the corresponding data request, passes control to the interface task 544 and goes to step S1040 (assuming that the downstream pull task is the last pull task). In step S1040, the controller 651 pushes data to the downstream push task (push task 540, for example) and goes to step S1042 and ends the data pipeline process.

While not shown by the flow chart in FIG. 12, the application following the last task pops the link from the process stack 400 and returns control to the last push task. The links are popped successively through upstream push tasks until the interface 544 is reached. The interface task 544 pops the forward message from the upstream pull task which in turn pops the next forward message from the process stack 400 until the interface task 542 is reached. The interface task 542 pops the link from the upstream push task and the upstream push task pops the link from upstream push task until the application at the beginning of the data pipeline process is reached.

As indicated by the dashed lines, all the steps enclosed by the box 1050 are associated with an intermediate pull task that is disposed between interface tasks 542 and 544. These steps may be repeated once for each additional pull task inserted between the interface tasks 542 and 544. If there is only one pull task between 542 and 544, all the pull tasks within the box 1050 are eliminated and only the last pull task remains.

Figure 13:
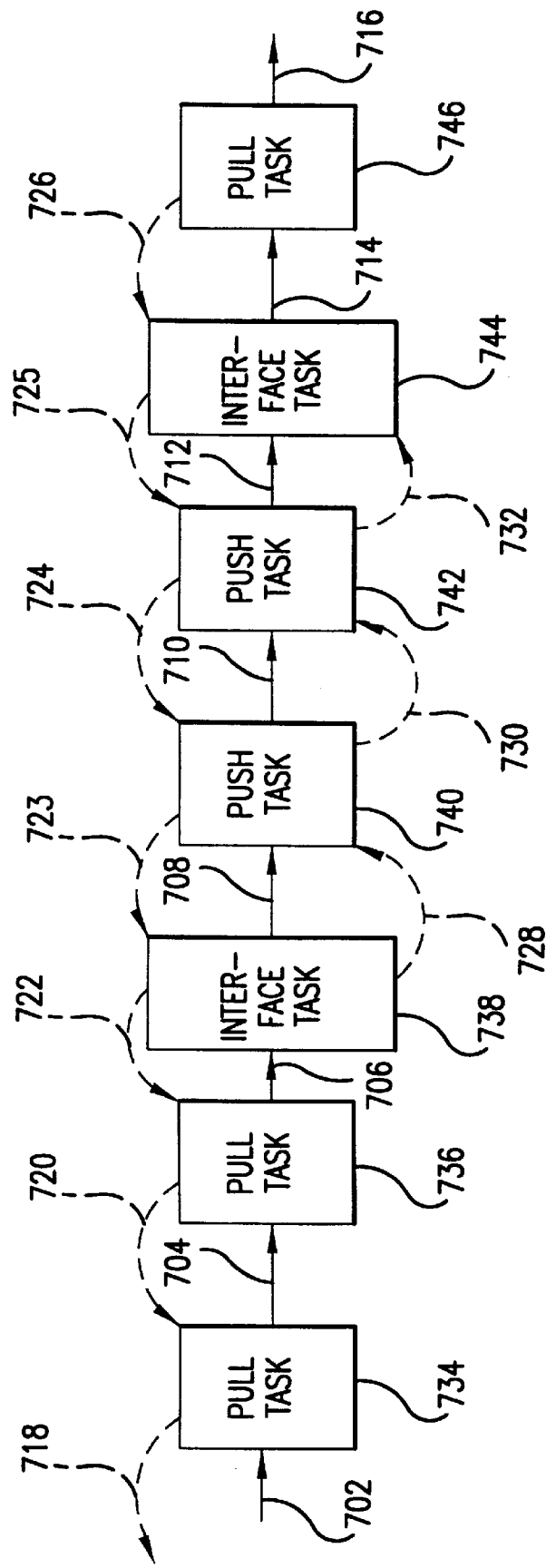
FIG. 13 shows a data processing string having push tasks inserted in a string of pull tasks.

FIG. 13 shows a data pipeline that embeds push tasks in a string of pull tasks. The data pipeline includes pull tasks 734, 736 and 746. Two push tasks 740 and 742 are inserted in this string of pull tasks and interface tasks 738 and 744 separate the pull tasks from the push tasks.

FIGS. 14–16 show block diagrams of interface tasks 738 and 744 and a generic push task 739. FIG. 14 shows the interface task 738 that includes an upstream link 802 and a downstream link 804. The upstream link 802 permits 738 to pull data from an upstream pull task while the downstream link 804 permits the interface task 738 to push data into downstream push tasks. FIG. 15 shows a block diagram of the push task 739 (the push task 739 represents any of the push tasks disposed between the interface tasks 738 and 744). The push task 739 includes a backward message link 808 that enables the push task 739 to indicate to an upstream task of a data request, a data buffer 810 and a downstream link 812. FIG. 16 shows in the interface task 744 which includes a backward message 806 that indicates to an upstream task of a data request.

Returning to FIG. 13, when ready to process more data, the pull task 746 sends a data request to the interface task 744 through link path 726. The pull task 746 may have either received a data request from a downstream pull task or a signal from an output device that requests more data. For example, the pull task 746 may request one line of data from interface task 744 in response to a downstream printing device. When the data request is received, the interface task 744 issues a backward message via link path 725 to the upstream push task 742 that a line of data is required. The backward message is pushed into the process stack 400 and control is passed to the upstream push task 742. The backward message does not contain a number of lines as did the forward message. The backward message merely indicates that downstream processes needs more data. The push task 742 responds by sending a backward message via link path 724 to the next upstream push task 740 which in turn sends a backward message via link path 723 to the interface task 738. Thus, the data request issued from the pull task 746 is propagated via the backward messages to the interface task 738 leaving a sequence of backward messages in the process stack 400.

When the backward message is received, the interface task 738 pulls data from the upstream pull task 736 via link path 722 which in turn pulls data from the next upstream pull task 734 via link path 720. Assuming that the pull task 734 is a first pull task, the pull task 734 sends a data request to a database via link path 718 and receives the data through the data path 702. The pull task 734 continues to send data requests to the database until enough data is received from the data path 702 to process the data and then sends the process output to the downstream pull task 736 through data path 704. The pull task 736 also waits until sufficient amount of input data is received from the upstream pull task 734 so that the corresponding pull task process may be executed and the output sent to the interface task 738 via data path 706.

When the interface task 738 receives data from the pull task 736, the data is pushed through the data path 708 to the downstream push task 740 as identified by link path 728. The link 728 is pushed into the process stack 400 and control is passed to the downstream push task. The push task 740 stores the data received from the interface task 738. If more data is required, the push task 740 again sends a backward message until enough data is received to execute the process of the push task 740. When sufficient data is available, the push task 740 executes the push task process and pushes the output through data path 710 to the downstream push task 742 as indicated by the link path 730, pushes the link 730 into the process stack 400, and passes control to the push task 742. The push task 742 also determines whether sufficient amount of data is available for processing and, when available, executes the push task process and pushes the output through data path 712 to the interface task 744 as indicated by link path 732, pushes the link 732 into the process stack 400, and passes control to the interface task 744.

When the interface task 744 receives the data from the push task 742, the links 732, 730, and 728 are returned and popped from the process stack 400 in sequence. After the interface task 738 gains control, backward messages 723, 724, and 725 are returned and popped from the process stack 400 in sequence and control returns to the interface task 744.

When the interface task 744 gains control, the data is forwarded to the pull task 746, the data request sent earlier via the link path 726 is popped and control is passed to the pull task 746. If the pull task 746 requires additional data (another line of data), the pull task 746 sends another data request via the link path 726 and the process repeats until the pull task 746 receives sufficient data to execute the pull task process and output the processed data through data path 716 to downstream tasks or devices at the end of the pipeline process, for example. Thus, the backward message permits the data request of the pull task 746 to be propagated to the pull task 736 to overcome the lack of upstream links of the push tasks 740 and 742.

Figure 17:
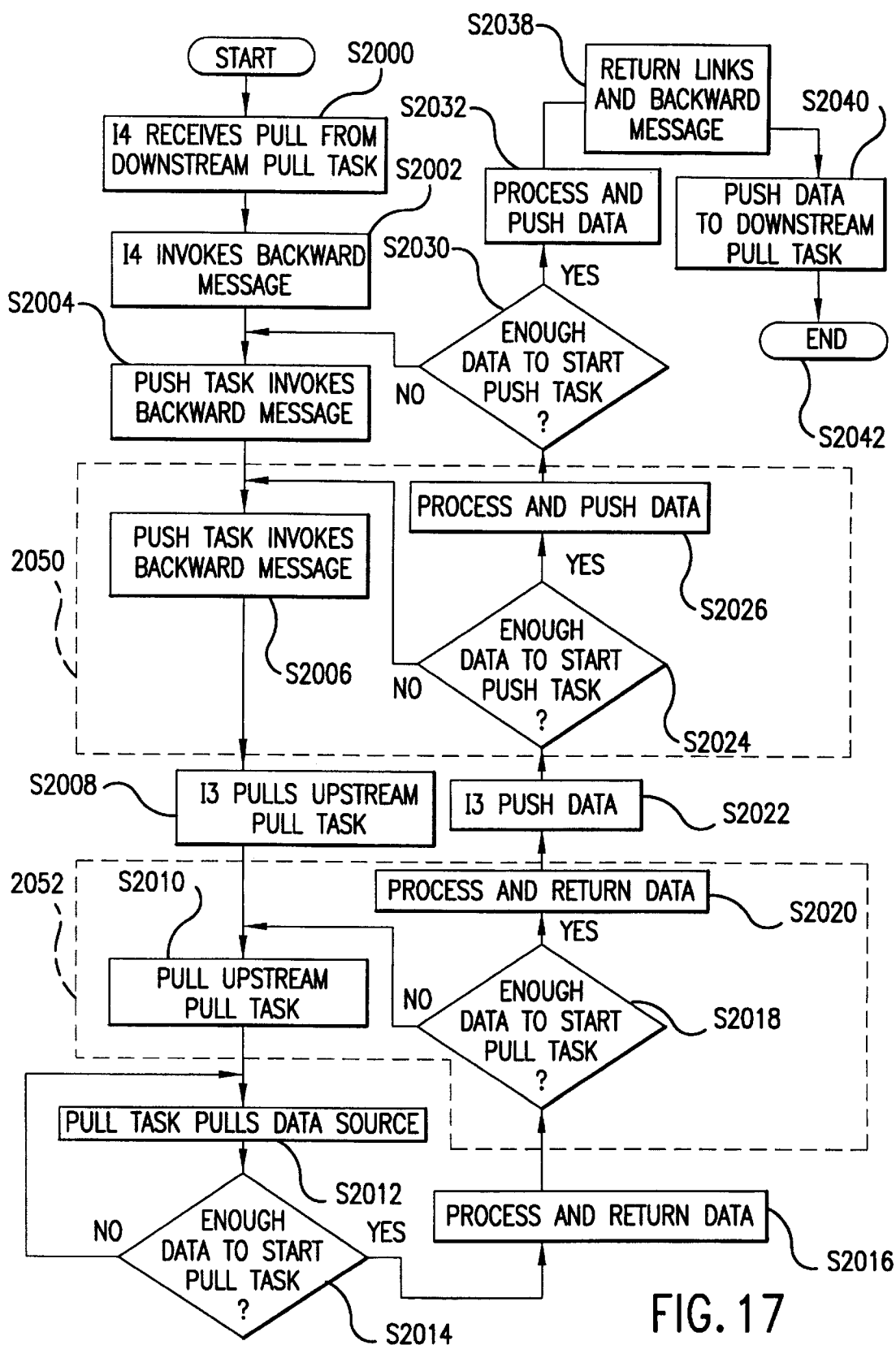
FIG. 17 shows a flow chart for the process shown in FIG. 13.

FIG. 17 shows a flow chart of a process executed by the controller 651 for the data pipeline shown in FIG. 13. In step S2000, the controller 651 receives a data request directed to the interface task 744 from the downstream pull task 746 and goes to step S2002. In step S2002, the controller 651 invokes a backward message from the interface task 744 to the upstream push task 742 and goes to step S2004. In step S2004, the controller 651 invokes a backward message from the push task 742 to the next upstream push task (push task 740, for example) and goes to step S2006. In step S2006, the controller 651 invokes a backward message from the next upstream push task to the interface task 738 and goes to step S2008. In step S2008, the interface task 738 sends a data request to upstream pull task 736 and goes to step S2010. In step S2010, the controller 651 sends a data request from the upstream pull task 736 to the next upstream pull task (pull task 734, for example) and goes to step S2012. In step S2012, the controller 651 pulls data from a data source such as a database (assuming that the upstream pull task 734 is a first pull task, for example) and goes to step S2014.

In step S2014, the controller 651 determines whether the data received from the data source is sufficient to start the upstream pull task 734. If the amount of data is sufficient, the controller 651 goes to step S2016; otherwise, the controller returns to step S2012 and sends another data request to the data source. In step S2016, the controller 651 processes the data for the upstream pull task 734 and returns the data to the calling downstream pull task 736 and goes to step S2018. In step S2018, the downstream pull task 736 determines whether sufficient amount of data is present to execute the pull task process. If sufficient data is present, the controller 651 goes to step S2020; otherwise, the controller 651 returns to step S2010 and pulls more data from the upstream pull task 734. In step S2020, the downstream pull task executes the pull task process and returns the data which also returns the data request to further downstream pull task or interface task 738 and goes to step S2022. In step S2022, the controller 651 pushes the data received from the upstream pull task 736 into the downstream push task 740, pushes the link 728 into the process stack 400, and returns control to the downstream push task 740, and goes to step S2024.

In step S2024, the controller 651 determines whether sufficient data has been received from the upstream push task (or the interface task 738). If sufficient amount of data is present, the controller 651 goes to step S2026; otherwise, the controller goes to step S2006. In step S2026, the controller 651 executes the push task process, pushes the data to the downstream push task 742, pushes the link 730 into the process stack 400, returns control to the downstream push task 742, and goes to step S2030. In step S2030, the controller 651 determines whether there is sufficient data to execute the downstream push task 742. If there is sufficient amount of data, the controller 651 goes to step S2032; otherwise, the controller 651 goes to step S2004.

In step S2032, the controller 651 performs the downstream push task 742 process for the received data, pushes the output to the interface task 744, pushes the link 732 into the process stack 400, returns control to the interface task 744, and goes to step S2038. In step S2038, the controller 651 returns the links 732, 730, and 728 and backward messages 723, 724 and 725 in sequence popping the respective items form the process stack 400, and goes to step S2040. In step S2040, the controller 651 pushes the data received from the upstream push task 742 to the downstream pull task and goes to step S2042 and ends.

While this invention has been described in conjunction with specific embodiments thereof, it is evident that many alternatives, modifications and variations will be apparent to those skilled in the art. For example, the processor 650 may be implemented using a variety of hardware such as application specific integrated circuits (ASIC), FPGAs, PLAs, etc. The processor 650 performs the functions discussed above and may be incorporated in any data processing devices such as printers, scanners, digital cameras, facsimile machines, digital TVs, etc.

Also, while the above description discusses processor stacks, returning forward and backward messages and returning data requests, these functions may be performed using other techniques such as multi-threaded processing, or multiple devices performing pull or push task functions. The process stack 400 is provided as an example. Other techniques for maintaining control of processing strings also may be used, such as task messaging schemes, mutually exclusive locks (Mutex locks) or semiphors used when the push or pull tasks are distributed. Accordingly, preferred embodiments of the invention as set forth herein are intended to be illustrative not limiting. Various changes may be made without departing from the spirit and scope of the invention.

What is claimed is:

1. A method for processing data with a data processing string, comprising:

providing at least one first type task having a first link in a first direction in the data processing string;

providing at least one second type task having a second link in a second direction and a third link in the first direction in the data processing string; and coupling the first type task and the second type task with a first interface task, wherein the first interface task interfaces the first link with the third link.

2. The method of claim 1, wherein the first type task is a pull task, the first link is a data request link to an upstream task, and the first direction is opposite a direction of a data flow.

3. The method of claim 2, wherein the second type task is a push task, the second link indicates a downstream task to which data is pushed from the second type task, the second direction is the same as the direction of the data flow.

4. The method of claim 3, wherein the first type task is upstream from the first interface task and the second type task, the method further comprising:

receiving a message via the third link from the second type task; and generating a data request from the first interface task to the first type task based on the message received via the third link.

5. The method of claim 1, wherein the first type task is a push task, the first link indicates a downstream task to which data is pushed from the first type task, and the first direction is in a direction of a data flow.

6. The method of claim 5, wherein the second type task is a pull task, the second link is a data request link to an upstream task, the second direction is opposite the direction of the data flow.

7. The method of claim 6, wherein the first type task is upstream from the first interface task and the second type task, the method further comprising:

receiving data from the first type task in a buffer associated with the first interface task; and generating a message from the first interface task to the second type task based on data received from the first type task, the message including an amount of data received from the first type task.

8. The method of claim 7, wherein the second type task pulls data from the buffer of the first interface task, a size of the buffer being adjusted based on an amount of data contained in the buffer.

9. The method of claim 1, further comprising providing at least one third type task;

providing a second interface task; and coupling the second type task with the third type task with the second interface task.

10. The method of claim 9, wherein the first and the third type tasks are pull tasks, and the method comprises:

receiving a data request in the second interface task from the third type task; and generating a message from the second interface to the second type task via the second link to indicate that data has been requested.

11. The method of claim 9, wherein the first and the third type tasks are push tasks, and the method comprises:

receiving a message from the second type task via the second link;

generating a data request from the second interface task to the second type task;

receiving data from the second type task; and pushing the data received from the second type task to the third type task.

12. A data processing device that processes data with a data processing string, comprising:

a memory; and a controller coupled to the memory, the controller executing at least one first type task having a first link in a first direction in the data processing string, at least one second type task having a second link in a second direction and a third link in the first direction in the data processing string, and a first interface task coupling the first type task and the second type task, wherein the first interface task interfaces the first link with the third link.

13. The device of claim 12, wherein the first type task is a pull task, the first link is a data request link to an upstream task, and the first direction is opposite a direction of a data flow.

14. The device of claim 13, wherein the second type task is a push task, the second link indicates a downstream task to which data is pushed from the second type task, the second direction is the same as the direction of the data flow.

15. The device of claim 14, wherein the first type task is upstream from the first interface task and the second type task, the controller receiving a message via the third link from the second type task, and generating a data request from the first interface task to the first type task based on the message received via the third link.

16. The device of claim 12, wherein the first type task is a push task, the first link indicates a downstream task to which data is pushed from the first type task, and the first direction is in a direction of a data flow.

17. The device of claim 16, wherein the second type task is a pull task, the second link is a data request link to an upstream task, the second direction is opposite the direction of the data flow.

18. The device of claim 17, wherein the first type task is upstream from the first interface task and the second type task, the device receiving data from the first type task in a buffer associated with the first interface task, and generating a message from the first interface task to the second type task based on data received from the first type task, the message including an amount of data received from the first type task.

19. The device of claim 18, wherein the second type task pulls data from the buffer of the first interface task, a size of the buffer being adjusted based on an amount of data contained in the buffer.

20. The device of claim 12, the controller executing at least one third type task and a second interface task, the controller interfacing the second type task with the third type task with the second interface task.

21. The device of claim 20, wherein the first and the third type tasks are pull tasks, and the device receiving a data request in the second interface task from the third type task, and generating a message from the second interface to the second type task via the second link to indicate that data has been requested.

22. The device of claim 20, wherein the first and the third type tasks are push tasks, and the device receiving a message from the second type task via the second link, generating a data request from the second interface task to the second type task, receiving data from the second type task, and pushing the data received from the second type task to the third type task.

23. An image processing apparatus comprising the data processing device of claim 12, wherein the image processing apparatus is one of a digital camera, a printer and a scanner.

* * * * *